(12) United States Patent
Garakani et al.

(10) Patent No.: US 7,382,730 B2
(45) Date of Patent: Jun. 3, 2008

(54) TWO-PASS METHOD AND APPARATUS FOR ACHIEVING MAXIMAL DATA COMPRESSION FOR A MODEM RELAY MODE OF OPERATION IN A VOICE FRAME NETWORK

(75) Inventors: Mehryar Khalili Garakani, Los Angeles, CA (US); Nathan R. Melhorn, Chelmsford, MA (US); Marcus Prewarski, Santa Barbara, CA (US)

(73) Assignee: Cisco Technology, Inc., San Jose, CA (US)

( * ) Notice: Subject to any disclaimer, the term of this patent is extended or adjusted under 35 U.S.C. 154(b) by 752 days.

(21) Appl. No.: 09/728,430

(22) Filed: Nov. 30, 2000

(65) Prior Publication Data

US 2002/0064168 A1 May 30, 2002

Related U.S. Application Data

(63) Continuation-in-part of application No. 09/715,438, filed on Nov. 16, 2000, now Pat. No. 7,299,795.

(51) Int. Cl.
 *H04L 12/56* (2006.01)
(52) U.S. Cl. .................................... 370/236; 370/401
(58) Field of Classification Search ........ 370/229–231, 370/236, 401, 410, 477, 352
See application file for complete search history.

(56) References Cited

U.S. PATENT DOCUMENTS 5,131,016 A * 7/1992 Broughton et al. ......... 375/240
6,292,840 B1 * 9/2001 Blomfield-Brown et al. ......................... 709/247
6,324,409 B1 * 11/2001 Shaffer et al. ........... 455/552.1
6,542,504 B1 * 4/2003 Mahler et al. .............. 370/392
6,603,774 B1 * 8/2003 Knappe et al. ............. 370/466
6,671,367 B1 * 12/2003 Graf et al. .................. 379/229
6,757,250 B1 * 6/2004 Fayad et al. ............. 370/235.1
6,882,711 B1 * 4/2005 Nicol ...................... 379/93.33
6,898,181 B1 * 5/2005 Rasanen ..................... 370/231

* cited by examiner

Primary Examiner—Wing Chan
Assistant Examiner—Saba Tsegaye
(74) Attorney, Agent, or Firm—Marger Johnson & McCollom, PC

(57) ABSTRACT

The present invention is a two-pass method and apparatus for achieving maximal data compression for a voice frame modem relay channel between two endpoint modems. The method includes transitioning the channel from a voice mode to a modem relay mode of operation; negotiating maximal compression parameters for either of two endpoint segments; communicating the same from one segment to the other; and then negotiating maximal end-to-end data compression parameters based upon the negotiated endpoint segment compression parameters. The end-to-end negotiation preferably involves re-negotiating one of the endpoint segments. The apparatus includes a dual first-pass negotiation mechanism for independently determining the maximal data compression capability of each segment; an end-to-end data compression capability determination mechanism for determining the maximal end-to-end data compression capability based upon the independently determined capability of each segment; and a second-pass negotiation mechanism for establishing the determined maximal end-to-end data compression capability for the channel.

10 Claims, 3 Drawing Sheets

TWO-PASS METHOD AND APPARATUS FOR ACHIEVING MAXIMAL DATA COMPRESSION FOR A MODEM RELAY MODE OF OPERATION IN A VOICE FRAME NETWORK

RELATED APPLICATIONS

This application is a continuation-in-part of U.S. patent application Ser. No. 09/715,438, filed Nov. 16, 2000 now U.S. Pat. No. 7,299,795 entitled HIGH-SPEED DIAL-UP MODEM SESSION STARTUP METHOD AND APPARATUS, subject to common ownership herewith by Cisco Technology, Inc.

BACKGROUND OF THE INVENTION

The present invention relates generally to voice frame network systems such as Voice over Internet Protocol (VoIP) systems for concurrently carrying both voice and data signals, and more particularly it concerns method and apparatus for transitioning a high-speed data channel from voice mode to modem relay mode during session startup.

VoIP is widely deployed by Internet Service Providers (ISPs) and within large or distributed private enterprises. Because voice channels require low latency for audio continuity and understanding in human conversation, typical VoIP implementations have utilized low-latency mechanisms such as Real-time Transfer Protocol (RTP). Unfortunately, the voice mode of VoIP channels that use RTP is an unreliable transport mechanism for high-speed modem signals. High packet drop rates and frequent retrains cause undesirable deterioration of the signal when high-speed modem signals are carried over a standard VoIP channel.

SUMMARY OF THE INVENTION

The present invention is a two-pass method and apparatus for achieving maximal data compression for a voice frame modem relay channel between two endpoint modems. The method includes transitioning the channel from a voice mode to a modem relay mode of operation; negotiating maximal compression parameters for either of two endpoint segments; communicating the same from one segment to the other; and then negotiating maximal end-to-end data compression parameters based upon the negotiated endpoint segment compression parameters. The end-to-end negotiation preferably involves re-negotiating one of the endpoint segments. The apparatus includes a dual first-pass negotiation mechanism for independently determining the maximal data compression capability of each segment; an end-to-end data compression capability determination mechanism for determining the maximal end-to-end data compression capability based upon the independently determined capability of each segment; and a second-pass negotiation mechanism for establishing the determined maximal end-to-end data compression capability for the channel.

DETAILED DESCRIPTION OF THE INVENTION

Figure 1:
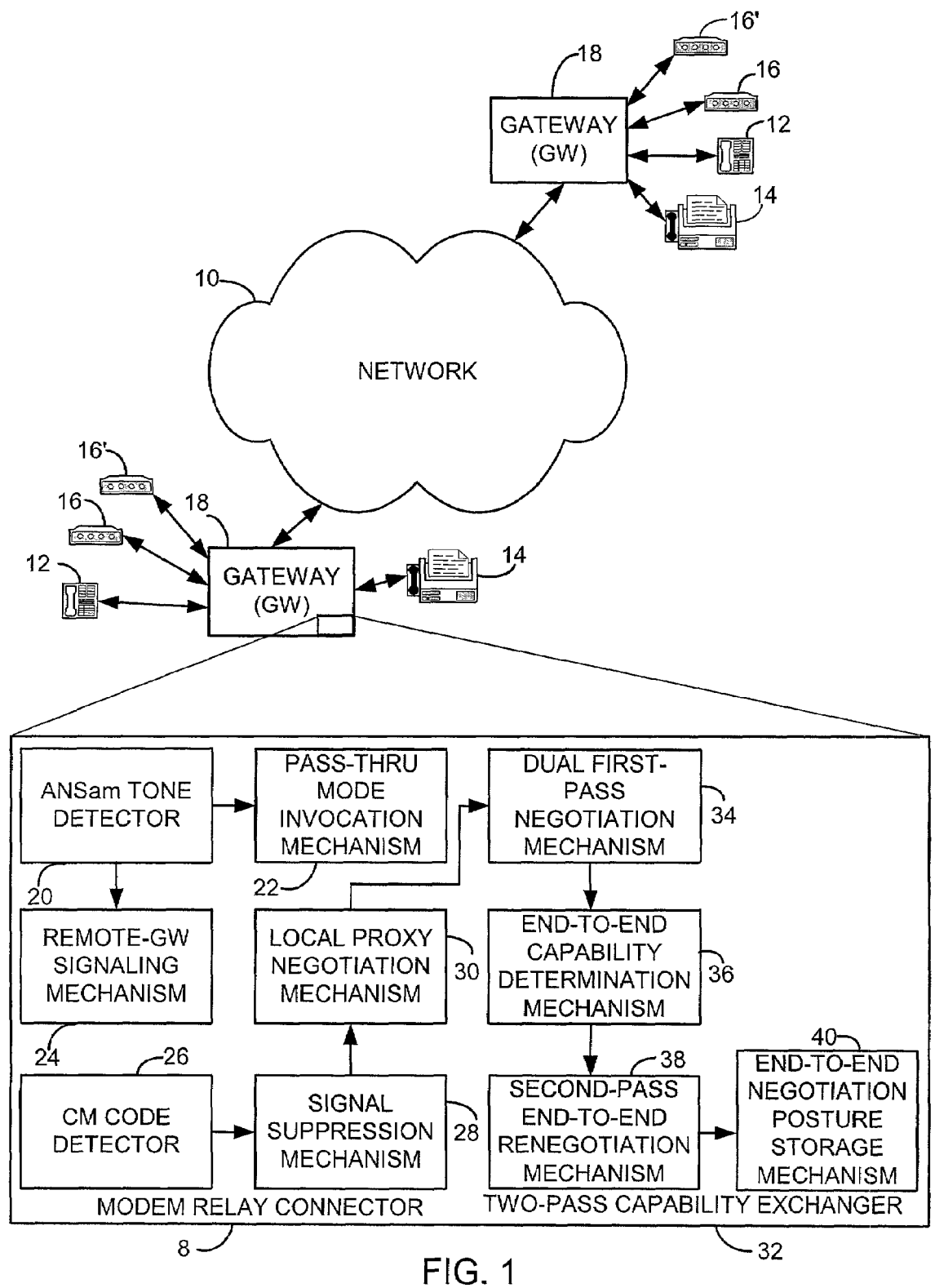
FIG. 1 is a system block diagram illustrating a VoIP network in which the two-pass capability-exchange apparatus is featured in accordance with a preferred embodiment of the invention.

FIG. 1 illustrates the invented apparatus 8 coupled with a network 10 operating with respect to voice traffic thereon in accordance with a voice packet protocol such as a voice over frame relay (VoFR) protocol or voice over Internet protocol (VoIp). Network 10 typically includes one or more telephone handsets 12, one or more fax machines 14 and one or more low-speed modems 16 representing different traffic demands on network 10 due to their diverse bandwidth requirements. The faxes 14 and low-speed modems 16 often share telephone numbers with the telephone handsets to provide facsimile, e-mail and Internet service to users/clients. High-speed modems 16' having data rates of 32 k-56 kbits/second (kbps) or higher are typically provided, and are the type of high-speed modems with which the invention finds particular utility.

Handsets 12 communicating voice typically require bit rates of approximately 8 k-64 kbps over the IP network. Typically, plural handsets 12 are connected with each one of plural voice gateways 18 representing so-called endpoint nodes within network 10. Handsets 12 will be understood to be used for voice communication, whereby voice signals are digitized, packetized and transmitted bi-directionally during a telephone conversation. In a voice frame network like network 10, concurrent with voice traffic over the network is the presence of an increasing volume of data traffic.

Those of skill in the art will appreciate that data and voice traffic are compatible to some extent because both are represented in network 10 in digital form. But voice and data traffic have different requirements, especially under increasing traffic demands. For example, voice traffic requires low latency because of the need for immediate feedback or other form of acknowledgement in a two-way human conversation. In voice mode, VoIP channels using RTP or other low-latency protocols represent an unreliable transport for high-speed signaling between high-speed modems 16'. Conventionally, in a VoIP network 10, high-speed modems 16' would have negotiated an end-to-end physical layer, e.g. V.34, and gateways 18 would have been passive enablers of the resulting voice mode VoIP connection which is subject to high packet drop rates and frequent retrains.

The invented solution to the problem described above is to terminate the physical layer, e.g. V.34, at the VoIP gateway, and to packetize and transmit the demodulated data bit stream over the IP network to the peer gateway where it is reconstructed and forwarded to the receiving modem. This is referred to as a modem relay mode of operation. By monitoring physical layer negotiation between the originating and answering endpoints during a predeterminedly early phase of the end-to-end negotiation between endpoints, it is determined whether the endpoints are modems negotiating a high-speed dial-up connection. If so, the VoIP gateways take over the end-to-end negotiation of the physical layer, terminating the physical layer locally on their adjacent telephony segment.

Modem relay startup must first determine that the originating and answering modems are high-speed modems through appropriate tone detection sensitive enough to distinguish low-speed modem 16 and fax 14 signals from high-speed modem 16' dial-up connections. It must then smoothly transition to modem relay mode at an appropriate time and in a non-disruptive manner during the sensitive end-to-end physical layer negotiation. For example, consider an enterprise with a dial-up server or machine S in a central office at location X and an employee at home who tries to make a dial-up connection from the employee's client end-station or machine C at location Y.

Assume the dial-up connection is made through a phone company P that provides the dial-up connection over a phone company P VoIP network. Such a call would have three segments:
  a) Segment 1: a telephony segment from client C to phone company P (e.g. local loop on the client end). This will be referred to herein as the calling leg.
  b) Segment 2: a VoIP segment within phone company P.
  c) Segment 3: a telephony segment from phone company P to server S (e.g. local loop on the server end). This will be referred to herein as the called leg.

Further assume that server machine S and client machine C are connected to the dial-up circuit through a high-speed modem 16' and that initially the VoIP channel is in voice mode.

Further assume that the physical layer (e.g., V.34) and the error correction layer (e.g. V.42) are terminated locally on the VoIP gateways, but the de/compression layer (e.g. V.42bis) is not terminated on the gateways and is performed end-to-end by the client modems. Those of skill in the art will appreciate that, for the above modem relay function to work, segments 1 and 3 must have the same compression parameters. This includes the following three parameters for V.42bis:
  1) V.42bis P0:PV, which identifies in which direction compression is performed,
  2) V.42bis P1:Pv, which is the Number of V.42bis Codewords,
  3) V.42bis P2:PV, which is V.42bis maximum String Length.

However, the V.42bis parameters are negotiated independently on segment 1 and segment 3. In segment 1 the negotiation occurs, between client C modem and its adjacent VoIP gateway from the phone company. In segment 3 the negotiation occurs between server S modem and its adjacent VoIP gateway.

This means there are four negotiating parties:
  1,2) two VoIP gateways,
  3) the client C modem, and
  4) the server S modem;

and two separate negotiation processes:
  1) between the client C modem and its VoIP gateway, and
  2) between the server S modem and its VoIP gateway.

As described above, for modem relay to work with V.42bis performed on the modems (instead of gateways), the two negotiation processes listed above must produce the same outcome. However, the maximal compression capability of the client C modem, the server S modem, and the VoIP gateways can be quite different. Moreover, if the two negotiation processes are conducted independently, there is no guarantee that the outcome will be the same.

A simple approach to achieve the same negotiated set of compression parameters on segment 1 and segment 3 is for the VoIP gateways to use a minimalist approach. For example, the VoIP gateways may negotiate the smallest allowed values for "Number of Codewords", and "Maximum String Length". As long as the parameters used are so small that all modem makes or models from various manufacturers can support them, this would result in the same negotiated set, which is desirable. However, this also means the modem relay session would have a very sub-optimal compression characteristics. Much higher compression ratios may be achievable between the client C and server S modems, if compression is based on the actual capabilities of the two modems.

The present invention involves maximizing data compression based upon the actual capability of the client C and server S modems. Much higher compression ratios thus are possible with the invention, compared to the simplistic approach of using minimal compression parameters, the 'least common denominator' approach described above.

Figure 2:
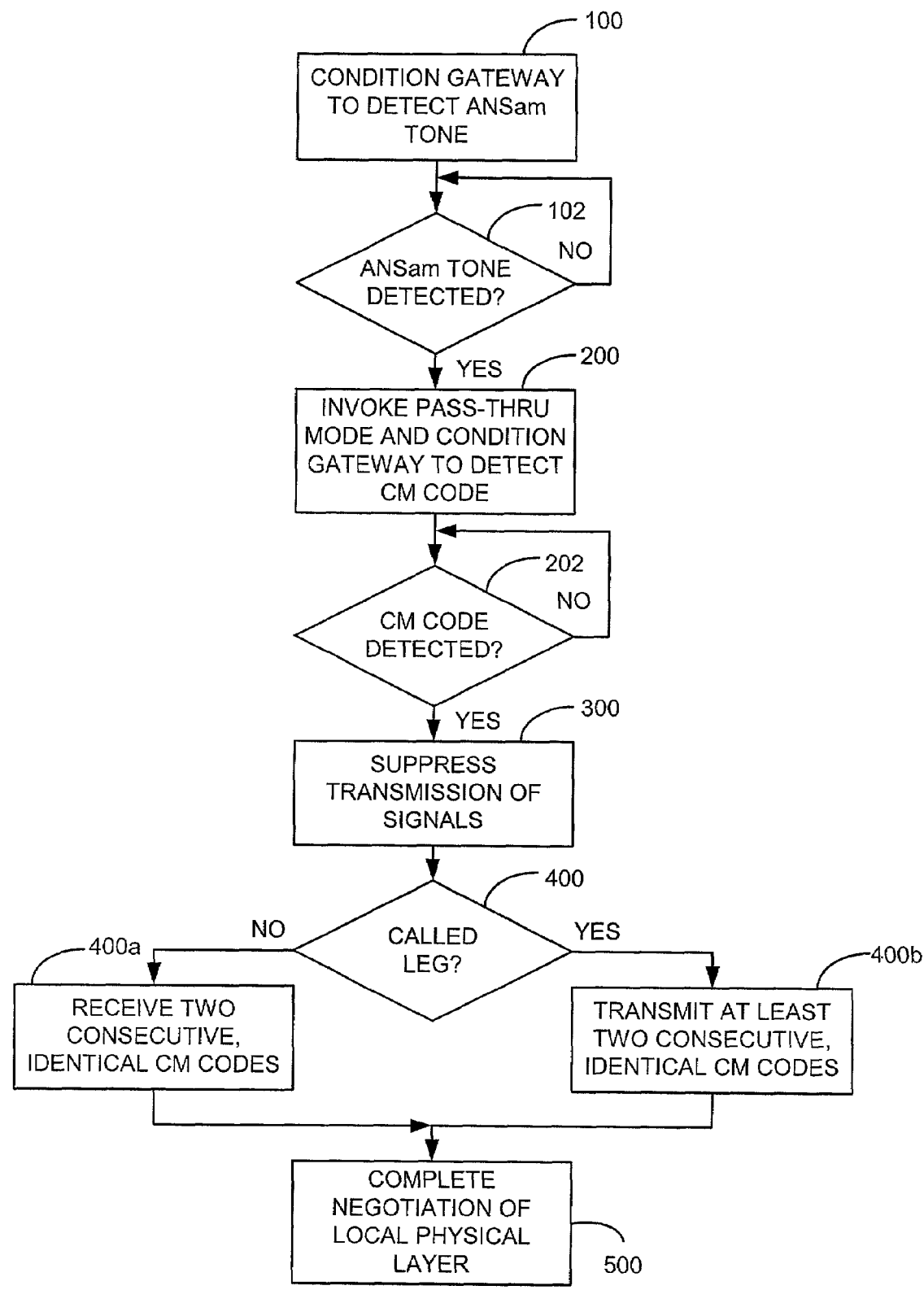
FIG. 2 is a flowchart of the voice mode-to-modem relay mode transition method in accordance with a preferred embodiment of the invention.

FIG. 2 is a flowchart illustrating the high-speed modem relay connection method in accordance with a preferred embodiment of the invention. The invented high-speed dial-up modem session startup method proceeds in five numbered steps as follows:

1) A VoIP gateway on the called leg is conditioned to detect an ITU-T V.8 amplitude-modulated answer tone (ANSam) signal on the stream at least from server machine S's modem to the VoIP gateway. Those of skill in the art will appreciate that detecting the ANSam signal is a strong indication that the answering modem (e.g. the server machine S modem in this example) supports high-speed dial-up connection via a V.34-compliant modem. The evolving ITU-T Recommendation V.8 (hereinafter the V.8 standard) is described in a February 1998 publication of the International Telecommunication Union entitled *Series V: Data Communication Over The Telephone Network* and subtitled *Procedures For Starting Sessions Of Data Transmission Over The Public Switched Telephone Network.*

In accordance with the preferred embodiment of the invention, either gateway is conditioned to detect ANSam. Occasionally, ANSam echoes back from a call-originating modem to the call-answering modem that generated the ANSam signal. Due to needed high-sensitivity in the tone detectors, ANSam then may be detected at either end. Because the earliest possible detection of ANSam is desired, in accordance with the invention, the gateways of both the called leg and the calling leg are conditioned to detect ANSam. The first gateway to detect ANSam then simply signals the other gateway that ANSam has been detected. Those of skill in the art will appreciate that such signaling may be performed in any suitable manner, e.g. via known out-of-band gateway-to-gateway signaling techniques.

Step 1 including ANSam tone detection is illustrated in FIG. 2 at 100 and 102.

2) As soon as the ANSam signal is detected, the channel is placed in a passthrough state by disabling voice compression and echo cancellation. This is accomplished preferably at both gateways, whereby the ANSam signal-detecting gateway signals the other gateway and both gateways proceed as follows. Voice compression is disabled (i.e. the channel is required to switch over to uncompressed G711 mode), assuming compression previously was enabled. (Those of skill in the art will appreciate this allows the least amount of distortion in the modem signals on the channel.) Also, voice echo cancellation is disabled, assuming it previously was enabled in voice mode. (Those of skill will appreciate that during the modem physical layer training phase, the modems configure their own echo cancellation parameters, which are used subsequently by the modems for echo cancellation.)

Next, and as part of step 2, the VoIP gateway on the calling leg is conditioned to detect a V.8 call menu (CM) signal (a digital code generated by a high-speed originating modem to indicate the fact) on the stream arriving from the originating modem on the calling leg. This is a further indication that modem relay transition is desired because it indicates that the originating modem is a high-speed modem compliant with V.34. (Those of skill in the art will appreciate that detection of a V.8 CM signal is important in accordance with the preferred embodiment of the invention by brief consideration of the case where the originating modem is V.32 and the answering modem is V.34. In such case, ANSam would be generated on the called leg, but there would be no CM generation.)

Those of skill in the art will appreciate that, in accordance with the preferred embodiment of the invention, both gateways are conditioned to detect CM even though it is the calling leg that generates CM. It is within the spirit and scope of the invention, however, to condition only the called-leg gateway to detect CM, assuming the called-leg gateway can be identified with sufficiently high probability.

Step 2 including CM code detection is illustrated in FIG. 2 at 200 and 202.

3) Upon CM detection, the CM-detecting gateway silences or suppresses transmission of modem signals to the other leg. This is to avoid undesirable end-to-end negotiation between the two modems that would otherwise result if successive identical CMs generated by the caller modem were received by the answering modem (which under a typical protocol would respond with a V.8 joint menu (JM) signal or code). The phenomenon whereby CM undesirably reaches the far end is referred to herein as CM leakage from the calling leg to the called leg. In accordance with the invention in its preferred embodiment, CM leakage is avoided.

Step 3 is illustrated in FIG. 2 at 300.

4) After signal suppression, the VoIP gateways undertake physical layer negotiation, effectively usurping the modems' normal role and preventing the modems from completing end-to-end negotiation. Those of skill in the art will appreciate that, by this time, the originating and answering modems already are partway through V.34 Phase 1 negotiation, which was conducted end-to-end by the modems via exchange of ANSam and CM. In accordance with the invention, the V.34 stacks on the VoIP gateways accommodate for this fact as follows.

4a) On the calling leg, the VoIP gateway acts like an answering modem in Phase 1 but begins with a local truncated V.34 Phase 1 negotiation. Phase 1 negotiation is continued by the gateway at the point subsequent to generation of the ANSam signal (i.e. the gateway need not generate any additional ANSam tones). The gateway awaits two additional CMs from the originating modem (e.g. the client machine C modem, in this example). When two additional identical CMs are received, the calling-leg gateway proceeds with the rest of V.34 Phase 1 and subsequent physical layer startup as usual (i.e. as specified in the V.8 standard).

Step 4a, including determining which leg gateway 18 is in, is illustrated in FIG. 2 at 400 and 400a.

4b) On the called leg, the VoIP gateway acts like an originating modem in Phase 1 but begins with a local truncated V.34 Phase 1 negotiation. Phase 1 negotiation is continued by the gateway at the point subsequent to generation of CM since the answering modem (e.g. the server machine S modem, in this example) already has generated ANSam. Thus, the called-leg gateway begins generating at least two identical CMs immediately and proceeds with the rest of Phase 1 and subsequent physical layer startup as usual (i.e. as specified in the V.8 standard).

Step 4b is illustrated in FIG. 2 at 400b.

5) With the transition complete, local physical layer negotiation on Segment 1 (between client machine C modem and its associated VoIP gateway) and Segment 3 (between server machine S modem and its associated VoIP gateway) have supplanted the initial end-to-end negotiation between the two modems. A modem relay session is established end to end in the form of a high-speed dial-up connection that is far more reliable than traditional voice mode connections within VoIP networks.

Step 5 is illustrated in FIG. 2 at 500.

In accordance with a preferred embodiment of the invention, CM signal tone detection in step 2) above may be performed as follows. The VoIP gateway demodulates the bit stream and looks for a specific bit pattern identifying modem CM. In the case of a V.8 modem, the bit pattern is 1111111111 0000001111 0100000111. The leading twenty bits represent the CM/JM wake-up and synchronize header. The trailing ten bits include an information octet (framed by start and stop bits) that represents the call function and V-Series modem type. The modem type should be V.34 or higher speed modem 16', in accordance with the invention.

Figure 3:
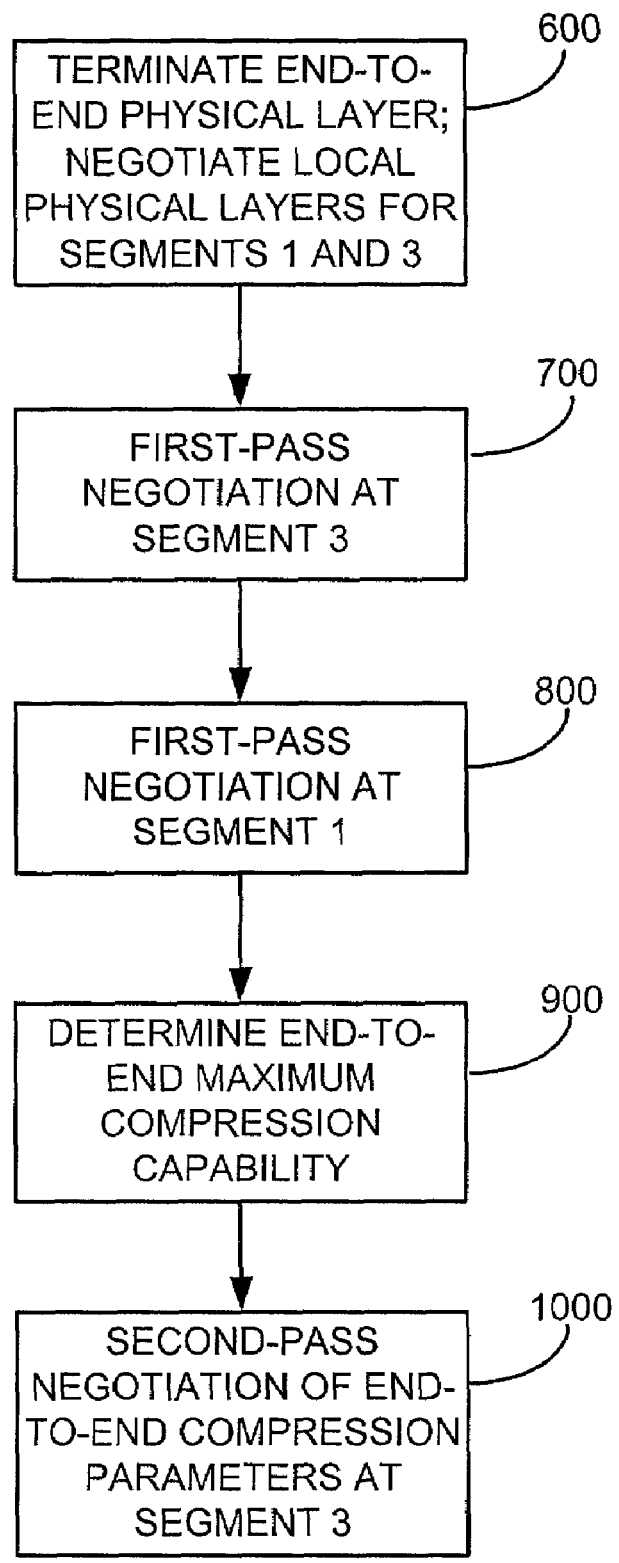
FIG. 3 is a flowchart of the maximal compression method in accordance with a preferred embodiment of the invention.

FIG. 3 illustrates the preferred method of the invention by which a two-pass capability exchange between high-speed dial-up modems achieves maximal compression based upon the maximum compression capability of both modems.

The approach presented here is described in terms of V.42bis compression parameters (and negotiation scheme). In other words, it is assumed that both the client C and the server S modems are V34/V.42bis modems. Those of skill in the art will appreciate, however, that, within the spirit and scope of the invention, other modems may be similarly accommodated. Thus, V34/V.42bis modems are described by way of illustration only and not by way of limitation, as the two-pass capability exchange method has a more general applicability, and the invented method is readily applicable to solve a wide set of negotiation problems having similar characteristics.

In a preferred embodiment of the invention, the following steps are realized.

1) A first pass detects the maximal compression capability of the adjacent modem on the called leg;

2) The maximal compression capability feasible end-to-end is determined (e.g. by determining the maximal compression capability of the adjacent modem on the calling leg, by communicating the called leg data compression capability to the calling leg and by establishing maximal compression parameters based thereon at the calling leg); and 3) A second pass renegotiates the called leg data compression parameters based on the maximal capability that is feasible end-to-end.

Referring to FIG. 3, the invented method will now be described in more detail.

Negotiation pass 1 determines the maximal capability of the adjacent modem on the called leg. The purpose of the first negotiation pass is to discover the maximal compression capability that can be achieved by the client C modem on the called leg. At the end of this step, for segment 3, the VoIP gateway determines the maximal capability of client C modem. To determine the maximal capability of the modem, the VoIP gateway assumes the following V.42bis compression parameters as its negotiation posture:

V.42bis P0:PV=11 (request compression in both directions),

V.42bis P1:PV=65535 (Number of Codewords),

V.42bis P2:PV=255 (Maximum String Length).

The above constitutes maximal values for P0, P1, and P2. Taking this set as its negotiation posture (during V.42 XID exchange), the VoIP gateway is able to determine the maximum actual compression capability feasible by the adjacent modem on segment 3.

The next step is to determine the maximal compression capability that is feasible end-to-end. Once the maximum capability is known on segment 3, the VoIP gateway on segment 3 must notify (e.g. signal or otherwise communicate to) the peer VoIP gateway on segment 1 of the maximal compression capability feasible on its segment. Those of skill in the art will appreciate that negotiation on segment 3 must be completed without timing out on segment 1. Thus, subsequent to transition into modem relay state (as described above and in our above-referenced co-pending patent application or by other suitable means), the gateway on segment 1 declines ("refuses") to respond back to V.8 CM generated by client modem on segment 1. It so declines to respond until it has received notification of the negotiation result on segment 3 from the VoIP gateway on segment 3. This means physical layer bring-up on segment 1 is delayed after transition into the modem relay state or mode of operation. While XID negotiation is performed at segment 3, the status of segment 1 involves the client C modem generating CMs, but receiving silence in return from the VoIP gateway on segment 1.

Once the VoIP gateway on segment 1 is notified of XID negotiation result on segment 3, it brings up its physical layer. The physical layer is brought up by responding to CM from the client C modem on segment 1 with an appropriate V.8 JM and by performing the rest of physical layer bring-up in a conventional manner, e.g. in accordance with the ITU-T V.8 protocol.

The VoIP gateway on segment 1 then uses the result of XID negotiation on segment 3 as its negotiation posture, and responds to XID generated by client modem C on segment 1 (assuming V.42 operation on segment 1), based on this negotiation posture.

XID negotiation on segment 1 determines the maximal end-to-end V.42bis parameters that can be established between the two modems. The VoIP gateway on segment 1 informs its peer VoIP gateway on segment 3 as to the result of the XID negotiation on segment 1, i.e. the segment 1 gateway signals the segment 3 gateway by any suitable signaling technique.

Negotiation pass 2 renegotiates on the called leg based upon the maximal capability that is feasible end-to-end. Once the end-to-end maximal capability is known to the VoIP gateway on segment 3, it renegotiates the data compression parameters on its segment. This is done by releasing the telephony segment 3 and redialing (reestablishing) the telephone half leg on segment 3. This reinitializes the physical layer and the V.42/V.42bis stacks on the VoIP gateway and client modem and allows the XID parameter negotiation to be repeated on segment 3. However, during this second-pass negotiation, the VoIP gateway on segment 3 assumes the end-to-end negotiation parameters determined in step 2 as its negotiation posture. This results in the use of compression parameters that represent the maximal set achievable by the two modems, as desired.

The VoIP gateways maintain this end-to-end set of compression parameters as their negotiation posture for the rest of the modem relay session (in case of any other XID negotiations that may occur through the remaining lifetime of the modem relay session). They do so in accordance with the invention by storing such parameters in memory. This means if there are any subsequent attempts by client or server modems C or S to change the established compression parameters during the data transfer phase, these would have no effect on the established negotiated set. (Such renegotiation is not allowed also by the V.42bis specification, and should not be expected. Nevertheless, as a precaution such parameters are stored and maintained in accordance with the invention).

Referring again now to FIG. 1, apparatus 8 will be described in more detail. Apparatus 8, which may be thought of as including a modem relay connection mechanism or modem relay connector, includes an ANSam tone detector 20; a passthrough (pass-thru) mode invocation mechanism 22; and preferably also a remote-gateway (remote-GW) signaling mechanism 24. Apparatus 8 also includes a CM code detector 26; a signal suppression mechanism 28; and a local proxy negotiation mechanism 30. As will be understood from the above description of the invented method, ANSam detector 20 causes pass-through mode invocation mechanism 22 to disable voice compression and cancellation if either or both are determined to have been enabled. ANSam detector 20 also causes remote-GW signaling mechanism 24 to signal the remote gateway 18 connected to the far-end modem. Those of skill in the art will appreciate that it is not yet determined to a high degree of certainty that both modems are high-speed.

Upon detection of a CM code by code detector 26, the transition to modem relay mode may begin, since detection of a CM code by either gateway 18 indicates that a high-speed modem 16' has received an ANSam from another high-speed modem 16' in accordance with the V.34 protocol. Thus, CM code detector 26 causes a signal suppression mechanism 28 immediately to suppress further signals between high-speed modems 16', effectively terminating the end-to-end physical layer negotiations therebetween. Once signals have been suppressed—at what is referred to herein as a predeterminedly early time in the end-to-end negotiations—local proxy negotiation mechanism 30 transmits or detects consecutive identical CM codes, as described above, and then completes local physical layer negotiation in accordance with the high-speed, dial-up V.34 modem protocol.

Referring still to FIG. 1, apparatus 8 may be seen further to include a two-pass capability exchange mechanism or exchanger 32. Capability exchanger 32 includes a dual first-pass negotiation mechanism 34, an end-to-end data compression capability determination mechanism 36, and a second pass end-to-end re-negotiation mechanism 38. Preferably, exchanger 32 further includes an end-to-end negotiation posture storage mechanism 40 for storing the end-to-end negotiation posture for possible future use between the two modems.

Dual first-pass negotiation mechanism 34 independently determines the maximal data compression capability of each segment, a segment being defined as a modem and its associated gateway. End-to-end data compression capability determination mechanism 36 determines the maximal end-to-end data compression capability based upon such independently determined maximal data compression capability of each segment. Second-pass end-to-end re-negotiation mechanism 38 then establishes the determined maximal end-to-end data compression capability for the channel between the two endpoint modems. Re-negotiation mechanism 38 is so-called because it effectively re-negotiates one or both segments to optimize the data compression parameters governing the channel, as described above. Those of skill in the art will appreciate that such a two-pass capability exchange renders data compression and decompression between the modems to be compatible and maximal, thereby greatly increasing the efficiency and throughput of the data channel.

Referring now to FIG. 3, the preferred method of the invention will be summarized. At 600, the end-to-end physical layer is terminated and local physical layer parameters are negotiated at either of segments 1 and 3. Such is the function performed by local proxy negotiation mechanism 30 and the other blocks within the modem relay connector of FIG. 1. At 700 and 800, the dual first-pass negotiations occur for endpoint segments 3 and 1, respectively. Such is the function performed by dual first-pass negotiation mechanism 34 of FIG. 1. At 900, the end-to-end maximum data compression capability of the channel is determined. Such is the function performed by end-to-end capability determination mechanism 36 of FIG. 1. At 1000, the second-pass negotiation of end-to-end compression parameters (e.g. re-negotiation of the segment 3 data compression parameters, as described above) occurs that results in maximal and compatible data compression between the modems. Such is the function performed by second-pass, end-to-end re-negotiation mechanism 38 of FIG. 1. It will be appreciated that the results of the first-pass negotiations for segments 1 and 3 are communicated by any suitable means in at least one direction between the endpoint segments, which makes the second-pass negotiation step possible.

Finally, those of skill in the art will appreciate that the invented method and apparatus described and illustrated herein may be implemented in software, firmware or hardware, or any suitable combination thereof. Preferably, the method and apparatus are implemented in software, for purposes of low cost and flexibility. Thus, those of skill in the art will appreciate that the method and apparatus of the invention may be implemented by a computer or microprocessor process in which instructions are executed, the instructions being stored for execution on a computer-readable medium and being executed by any suitable instruction processor. Alternative embodiments are contemplated, however, and are within the spirit and scope of the invention.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

We claim:

1. A method of negotiating maximal data compression of a modem relay channel, comprising:
    determining a first maximal data compression on a first leg;
    determining a second maximal data compression on a second leg;
    comparing the first maximal data compression and the second maximal data compression;
    selecting an end-to-end maximal data compression based on the first and second maximal data compressions;
    renegotiating one or more of the first and second maximal data compressions to conform to the end-to-end maximal data compression;
    saving the end-to-end maximal data compression in memory;
    using the end-to-end maximal data compression stored in memory to prevent renegotiation of by the first or second legs; and
    transmitting data using the end-to-end maximal data compression.

2. The method of claim 1, further comprising delaying negotiations on the second leg until a maximal data compression on the first leg has been determined.

3. The method of claim 1, determining a maximal data compression on a first leg further comprising determining a maximal data compression on a called leg, and determining a maximal data compression on a second leg further comprising determining a maximal data compression on a calling leg.

4. The method of claim 3, the method further comprising delaying negotiations on the calling leg until notification is received from the called leg.

5. The method of claim 1, determining a maximal data compression on a first leg further comprising negotiating a maximal data compression on a calling leg and determining a maximal data compression on a second leg further comprising determining a maximal data compression on a called leg.

6. A network device, comprising:
    a connector to allow the device to connect to a network and receive a signal from a remote gateway of a maximal data compression on a remote leg;
    a dual first-pass negotiation mechanism to negotiate a first and a second maximal data compression capability for each of a first and second leg;
    an end-to-end compression capability determination mechanism to select an end-to-end maximal data compression capability based upon the first and second maximal data compression capabilities;
    a second pass end-to-end renegotiation mechanism to renegotiate one or more of the first or second maximal data compression to conform to the end-to-end maximal data compression capability;
    a memory to store the end-to-end maximal data compression capability, the second pass renegotiation mechanism to use the end-to-end maximal data compression capability stored in memory to prevent renegotiation by the first-pass negotiation mechanism.

7. An article of computer-readable media that stores a computer program that, when executed, causes a computer to:
    determine a first maximal data compression on a first leg;
    determine a second maximal data compression on a second leg;
    compare the first maximal data compression and the second maximal data compression;
    select an end-to-end maximal data compression based on the first and second maximal data compressions;
    renegotiate one or more of the first and second maximal data compressions;
    save the end-to-end maximal data compression in memory;
    use the end-to-end maximal data compression stored in memory to prevent renegotiation of by the first or second legs; and
    transmit data using the maximal end-to-end data compression.

8. The article of claim 7, the program further causing the computer store the end-to-end maximal compression parameters in memory.

9. The article of claim 7, the program further causing the computer to use the end-to-end maximal compression parameters stored in memory to prevent renegotiation by either the called leg or the calling leg.

10. A network device, comprising:

a means for allowing the device to connect to a network and receive a signal from a remote gateway of a maximal data compression on a remote leg;

a means for delaying data compression negotiations until the signal is received;

a means for negotiating a first and a second maximal data compression capability for each of a first and second leg;

a means for selecting an end-to-end maximal data compression capability based on the first and second maximal data compression capabilities;

a means for renegotiating one or more of the first or second maximal data compression based upon the end-to-end maximal data compression capability;

a means for storing the end-to-end maximal data compression;

a means for using the end-to-end maximal data compression to prevent renegotiation of by the first or second legs; and a means for signaling the remote gateway that negotiations are complete.

* * * * *